(12) United States Patent
Uruma et al.

(10) Patent No.: US 8,555,290 B2
(45) Date of Patent: Oct. 8, 2013

(54) APPARATUS AND METHOD FOR DYNAMIC CONTROL OF THE NUMBER OF SIMULTANEOUSLY EXECUTING TASKS BASED ON THROUGHPUT

(75) Inventors: Fumitaka Uruma, Yokohama (JP); Yoshiko Yaegashi, Tama (JP)

(73) Assignee: International Business Machines Corporation, Armonk, NY (US)

( * ) Notice: Subject to any disclaimer, the term of this patent is extended or adjusted under 35 U.S.C. 154(b) by 1052 days.

(21) Appl. No.: 12/405,186

(22) Filed: Mar. 16, 2009

(65) Prior Publication Data

US 2009/0235274 A1  Sep. 17, 2009

(30) Foreign Application Priority Data

Mar. 17, 2008  (JP) .................................. 2008-68404

(51) Int. Cl.
*G06F 9/46* (2006.01)
*G06F 15/16* (2006.01)
(52) U.S. Cl.
USPC .......................................... 718/106; 709/201
(58) Field of Classification Search
None
See application file for complete search history.

(56) References Cited

U.S. PATENT DOCUMENTS

2002/0133536 A1* 9/2002 Ramachandran ............. 709/201

FOREIGN PATENT DOCUMENTS

| JP | 2001256207 A | 9/2001 |
|---|---|---|
| JP | 2002259143 A | 9/2002 |
| JP | 2005222332 A | 8/2005 |
| WO | 2006100752 A1 | 9/2006 |

OTHER PUBLICATIONS

Leon, A. S.; Tam, K. W.; Shin, J. L.; Weisner, D.; Schumacher, F.; , "A Power-Efficient High-Throughput 32-Thread SPARC Processor," Solid-State Circuits, IEEE Journal of , vol. 42, No. 1, pp. 7-16, Jan. 2007.*

* cited by examiner

*Primary Examiner* — Eddie P Chan
*Assistant Examiner* — William Partridge
(74) *Attorney, Agent, or Firm* — Prentiss W. Johnson; Edell, Shapiro & Finnan, LLC

(57) ABSTRACT

A task count controller, a task count control method, and a computer program capable of dynamically controlling the number of tasks that can be processed in parallel simultaneously without increasing computational load are provided. When a plurality of tasks are to be executed simultaneously in parallel processing, the number of tasks that can be executed simultaneously is controlled. The tasks to be executed simultaneously are added in units of a predetermined number of tasks and the throughput in one unit of work is measured for each task every time the tasks are added. The total sum of the measured throughputs is calculated, and it is determined whether the calculated total sum of throughputs is more than the total sum of throughputs immediately before the predetermined number of tasks are added.

20 Claims, 14 Drawing Sheets

APPARATUS AND METHOD FOR DYNAMIC CONTROL OF THE NUMBER OF SIMULTANEOUSLY EXECUTING TASKS BASED ON THROUGHPUT

RELATED APPLICATION

This application claims the benefit of and priority to Japanese Application Number 2008-68404, filed Mar. 17, 2008, the contents of which are incorporated by reference herein in its entirety.

BACKGROUND

1. Field

This disclosure generally relates to apparatuses and methods used to control task count. More particularly, the disclosure relates to a task count controller, a task count control method, and a computer program capable of dynamically controlling the number of tasks that can be processed in parallel simultaneously.

2. General Background

Along with the recent rapid progress of computer technology, the amount of data processable in a processor is rapidly increasing. When current information processing technologies are applied in various industries, the demand is higher for data processing capabilities than a processor enhancing speed. Therefore, demand exists for improving processing throughput by parallel processing, e.g., pipeline processing.

For example, it is impossible to avoid a reorganization process for removing fragmentation caused by a repetition of inserting and deleting records into or from a database that is frequently used in any data processing, as long as the insertion and deletion of records are repeated. In addition, it takes considerable time for the reorganization process. Therefore, there is a particularly great demand for processing a plurality of tasks for the reorganization process in parallel simultaneously.

In general, however, various tasks are processed in parallel in a computer in which a database is configured. Thus a computational load varies momentarily according to whether a task is light or heavy or to the task start or end timing. Therefore, there is a demand to optimize the number of tasks for simultaneously performing the reorganization process in parallel.

For example, Japanese Patent Application Publication No. 2002-259143 discloses a method for automatically controlling a task count which calculates an optimal number of tasks by acquiring a task operation status at regular time intervals as throughput, resource utilization, and CPU usage rate and comparing these values with preset reference values. In Japanese Patent Application Publication No. 2002-259143, the number of tasks is automatically controlled so as not to exceed a reference value.

SUMMARY

In one aspect of the disclosure, a computer program product is provided. The computer program product has a computer useable medium, which has a computer readable program. When executed on a computer, the computer readable program causes the computer to add to a memory a predetermined number of tasks to be executed simultaneously. Each task has a plurality of units of work. Further, when executed on the computer, the computer readable program causes the computer to measure, for each of the predetermined number of tasks, a throughput. The throughput is a processing time for one unit of work of that task. In addition, when executed on the computer, the computer readable program causes the computer to calculate a current total sum of throughputs that equals the sum of the measured throughputs for the predetermined number of tasks. Finally, when executed on the computer, the computer readable program causes the computer to halt addition of any other tasks if the current total sum of throughputs is less than or equal to a prior calculated total sum of throughputs for tasks executed prior to addition of the predetermined number of tasks.

In another aspect of the disclosure, a process is provided. The process adds to a memory a predetermined number of tasks to be executed simultaneously. Each task has a plurality of units of work. Further, the process measures, for each of the predetermined number of tasks, a throughput. The throughput is a processing time for one unit of work of that task. In addition, the process calculates a current total sum of throughputs that equals the sum of the measured throughputs for the predetermined number of tasks. Finally, the process halts addition of any other tasks if the current total sum of throughputs is less than or equal to a prior calculated total sum of throughputs for tasks executed prior to addition of the predetermined number of tasks.

In yet another aspect of the disclosure, an apparatus is provided. The system includes a processor that adds to a memory a predetermined number of tasks to be executed simultaneously, measures, for each of the predetermined number of tasks, a throughput, calculates a current total sum of throughputs that equals the sum of the measured throughputs for the predetermined number of tasks, and halts addition of any other tasks if the current total sum of throughputs is less than or equal to a prior calculated total sum of throughputs for tasks executed prior to addition of the predetermined number of tasks. Each task has a plurality of units of work measures. The throughput is a processing time for one unit of work of that task.

DRAWINGS

The above-mentioned features of the present disclosure will become more apparent with reference to the following description taken in conjunction with the accompanying drawings wherein like reference numerals denote like elements and in which.

DETAILED DESCRIPTION

Figure 1:
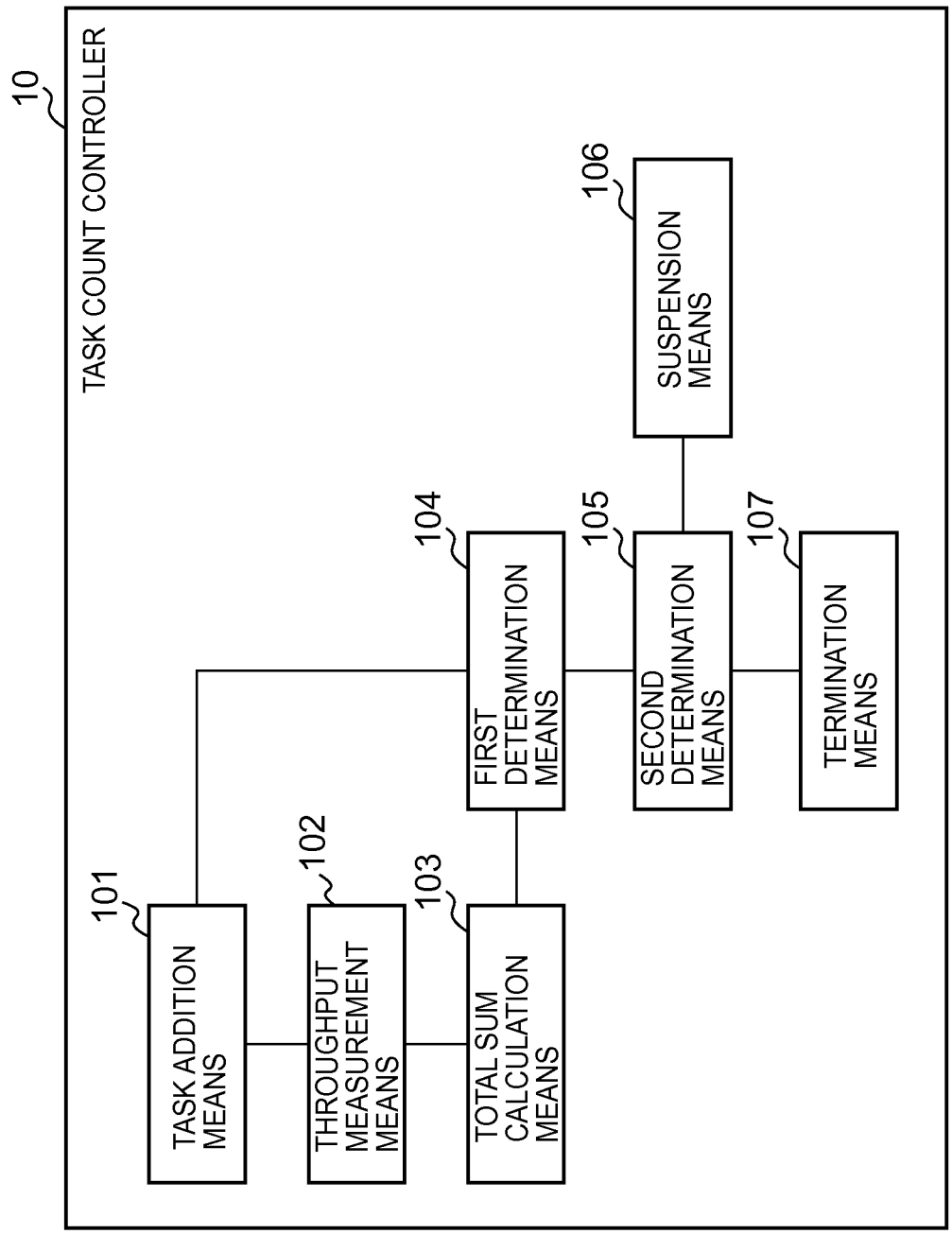
FIG. 1 is a functional block diagram schematically illustrating functions of a task count controller.

In general, various tasks are processed in parallel in a computer in which a database is configured, and a computational load varies momentarily. Therefore, it is practically impossible to previously determine the reference value for determining the number of tasks for reorganization to be processed in parallel simultaneously as described in Japanese Patent Application Publication No. 2002-259143, and at best the number of tasks could be controlled on the basis of the reference value, which has been statistically determined based on the throughput at the task start, the resource utilization, and the CPU usage rate. This leads to a low reliability of the reference value itself for controlling the number of tasks, which causes a problem that whether the number of tasks is actually optimal is forced to be determined based on the experience of a user who determines the reference value.

On the other hand, it is necessary to send an inquiry to the operating system at regular time intervals in order to dynamically acquire the throughput, the resource utilization, and the CPU usage rate, which, by contrast, leads to an increase in computational load, thus causing a problem of decreasing the number of tasks for performing the reorganization process in parallel simultaneously, which has been originally intended.

The present disclosure aims at solving the above problems of the conventional technique. The present disclosure provides a task count controller, a task count control method, and a computer program therefor capable of dynamically controlling the number of tasks that can be processed in parallel simultaneously without increasing the computational load.

According to a first aspect of the present disclosure, there is provided a task count controller for controlling the number of tasks that can be executed simultaneously in the case of executing a plurality of tasks simultaneously in parallel processing, comprising task addition means which adds tasks to be executed simultaneously in units of a predetermined number of tasks, throughput measurement means which measures a throughput in one unit of work for each task every time the task addition means adds the tasks, total sum calculation means which calculates the total sum of throughputs measured by the throughput measurement means, and first determination means which determines whether the total sum of throughputs calculated by the total sum calculation means is more than the total sum of throughputs immediately before the predetermined number of tasks are added, wherein the task addition means continues the addition of tasks in the case where the first determination means determines that the total sum of throughputs is more than the total sum of throughputs immediately before the predetermined number of tasks are added and halts the addition of tasks in the case where the first determination means determines that the total sum of throughputs is equal to or less than the total sum of throughputs immediately before the predetermined number of tasks are added.

Moreover, the task count controller according to a second aspect of the present disclosure, further comprises, in the first aspect of the present disclosure, second determination means which determines whether the calculated total sum of throughputs is more than the total sum of throughputs previous to the total sum of throughputs immediately before the predetermined number of tasks are added in the case where the first determination means determines that the total sum of throughputs is equal to or less than the total sum of throughputs immediately before the predetermined number of tasks are added, and suspension means which stores information for identifying the predetermined number of tasks added last and suspends the execution of the predetermined number of tasks added last in the case where the second determination means determines that the calculated total sum of throughputs is more than the total sum of throughputs previous to the total sum of throughputs immediately before the predetermined number of tasks are added.

Moreover, the task count controller according to a third aspect of the present disclosure, further comprises, in the second aspect of the present disclosure, termination means which stores information for identifying the predetermined number of tasks added last and information necessary to rerun the tasks and terminates the execution of the predetermined number of tasks added last in the case where the second determination means determines that the calculated total sum of throughputs is equal to or less than the total sum of throughputs previous to the total sum of throughputs immediately before the predetermined number of tasks are added.

Moreover, the task count controller according to a fourth aspect of the present disclosure is characterized in that, in one of the first to third aspects of the present disclosure, the predetermined number is 1.

According to a fifth aspect of the present disclosure, there is provided a computer program executable in a task count controller for controlling the number of tasks that can be executed simultaneously in the case where a plurality of tasks are executed simultaneously in parallel processing, the program causing the task count controller to function as task addition means which adds tasks to be executed simultaneously in units of a predetermined number of tasks, throughput measurement means which measures a throughput in one unit of work for each task every time the task addition means adds the tasks, total sum calculation means which calculates the total sum of throughputs measured by the throughput measurement means, and first determination means which determines whether the total sum of throughputs calculated by the total sum calculation means is more than the total sum of throughputs immediately before the predetermined number of tasks are added, wherein the program causes the task addition means to function as means which continues the addition of tasks in the case where the first determination means determines that the total sum of throughputs is more than the total sum of throughputs immediately before the predetermined number of tasks are added, and halts the addition of tasks in the case where the first determination means determines that the total sum of throughputs is equal to or less than the total sum of throughputs immediately before the predetermined number of tasks are added.

According to a sixth aspect of the present disclosure, there is provided a task count control method capable of being performed on a computer for controlling the number of tasks that can be executed simultaneously in the case of executing a plurality of tasks simultaneously in parallel processing, the task count control method comprising the steps of adding tasks to be executed simultaneously in units of a predetermined number of tasks, measuring a throughput in one unit of work for each task every time the predetermined number of tasks are added, calculating the measured total sum of throughputs, and determining whether the calculated total sum of throughputs is more than the total sum of throughputs immediately before the predetermined number of tasks are added, wherein the addition of tasks is continued in the case where it is determined that the calculated total sum of throughputs is more than the total sum of throughputs immediately before the predetermined number of tasks are added, and the addition of tasks is halted in the case where it is determined that the calculated total sum of throughputs is equal to or less than the total sum of throughputs immediately before the predetermined number of tasks are added.

In the first, fifth, and sixth aspects of the present disclosure, the tasks executed simultaneously are added in units of the predetermined number of tasks and the throughput in one unit of work is measured for each task every time the predetermined number of tasks are added. The total sum of measured throughputs is calculated and it is then determined whether the calculated total sum of throughputs is more than the total sum of throughputs immediately before the predetermined number of tasks are added. If it is determined that the calculated total sum of throughputs is more than the total sum of throughputs immediately before the predetermined number of tasks are added, the addition of tasks is continued. If it is determined that the calculated total sum of throughputs is equal to or less than the total sum of throughputs immediately before the predetermined number of tasks are added, the addition of tasks is halted. If there is enough computing power, the throughput generally increases as the number of tasks increases. The rate of increase of the throughput, however, decreases as the allowance in the computing power decreases and the throughput drops rapidly at the time when there is almost no allowance in the computing power. With such a characteristic of the throughput, it is possible to determine whether there is enough computing power and to determine the upper limit of the number of tasks that can be processed in parallel simultaneously by comparing the total sum of throughput measurements before and after adding a predetermined number of tasks and determining whether the throughput decreases after adding the predetermined number of tasks.

The term "one unit of work" means one of a plurality of units of work included in a task and the present disclosure is intended to measure the throughput of one process of one unit of work, instead of a throughput at the time when the process of the overall task completes. In addition, the term "throughput" is an index indicating a process efficiency using the number of processed data per unit time. The term "total sum of throughputs immediately before the predetermined number of tasks are added" means the total sum of throughputs for (n−m) tasks (m is the predetermined number) in the case where the total sum of throughputs measured most recently is for n tasks, for example. More specifically, the term means the total sum of throughputs calculated at the previous time among the total sums of throughputs measured every time the predetermined number of tasks are added.

In the second aspect of the present disclosure, it is determined whether the calculated total sum of throughputs is more than the total sum of throughputs previous to the total sum of throughputs immediately before the predetermined number of tasks are added in the case where it is determined that the calculated total sum of throughputs is equal to or less than the total sum of throughputs immediately before the predetermined number of tasks are added. If it is determined that the calculated total sum of throughputs is more than the total sum of throughputs previous to the total sum of throughputs immediately before the predetermined number of tasks are added, information for identifying the predetermined number of tasks added last is stored and the execution of the predetermined number of tasks added last is suspended. Unless the calculated total sum of throughputs decreases to the same level as the total sum of throughputs previous to the total sum of throughputs immediately before the predetermined number of tasks are added, it is possible to determine that the computing power is getting closer to the limit of the computing power to the extent that new tasks cannot be added any more. Therefore, it is also possible to reduce the time until the tasks are rerun without decreasing the overall throughput any more by suspending the tasks added most recently so as to be rerun immediately after other tasks are terminated.

In the above, the term "total sum of throughputs previous to the total sum of throughputs immediately before the predetermined number of tasks are added" means the total sum of throughputs for (n−m×2) tasks (m is the predetermined number) in the case where the measured throughputs are those for n tasks, for example. More specifically, the term means the total sum of throughputs calculated at the time before the previous time with respect to the total sum of throughputs measured every time the predetermined number of tasks are added. Moreover, the term "suspending the execution of tasks" means halting the tasks under execution, while the computer resources including the memory are not released.

In the third aspect of the present disclosure, in the case where it is determined that the calculated total sum of throughputs is equal to or less than the total sum of throughputs previous to the total sum of throughputs immediately before the predetermined number of tasks are added, the termination means stores information for identifying the predetermined number of tasks added last and information necessary to rerun the tasks and terminates the execution of the predetermined number of tasks added last. If the calculated total sum of throughputs is lower than the total sum of throughputs previous to the total sum of throughputs immediately before the predetermined number of tasks are added, it is possible to determine that the limit of the computing power is exceeded. Therefore, it is possible to prevent a further reduction in the overall throughput by immediately terminating the tasks added most recently and releasing the computer resources occupied by the tasks. The term "terminating the execution of the tasks" means forcibly terminating the tasks under execution and releasing all computer resources including memory.

In the fourth aspect of the present disclosure, the predetermined number is 1 and therefore a task is added one by one, which allows the task count limit for improving the throughput to be accurately determined.

In the preferred embodiments described later, task addition means 101, throughput measurement means 102, total sum calculation means 103, and first determination means 104 correspond to the process of step S707 of a CPU 11, the process of step S502 of the CPU 11, the process of step S703 of the CPU 11, and the process of step S705 of the CPU 11, respectively. Moreover, second determination means 105, suspension means 106, and termination means 107 correspond to the process of step S709 of the CPU 11, the process of step S711 of the CPU 11, and the process of step S713 of the CPU 11, respectively.

According to the present disclosure, it is possible to determine whether there is enough computing power and to determine the upper limit of the number of tasks that can be processed in parallel simultaneously by comparing the total sum of throughput measurements before and after adding a predetermined number of tasks and determining whether the throughput decreases after adding the predetermined number of tasks by utilizing the characteristic that the rate of increase in throughput decreases as the allowance in the computing power decreases and the throughput drops rapidly at the time when there is almost no allowance in the computing power.

Hereinafter, a task count controller according to the embodiment of the present disclosure will be described in detail with reference to the accompanying drawings. Referring to FIG. 1, there is shown a functional block diagram typically illustrating the functions of a task count controller 10 according to the embodiment of the present disclosure. In FIG. 1, task addition means 101 adds tasks in units of a predetermined number of tasks to be processed in parallel simultaneously. In addition, throughput measurement means 102 measures the throughput in one unit of work for each task every time the task addition means 101 adds the tasks.

Total sum calculation means 103 calculates the throughputs measured by the throughput measurement means 102, namely the total sum of throughputs of tasks in the case where the tasks are added in units of the predetermined number of tasks. First determination means 104 determines whether the total sum of throughputs calculated by the total sum calculation means 103 is equal to or less than the total sum of throughputs immediately before the predetermined number of tasks are added. Note here that the term "total sum of throughputs immediately before the predetermined number of tasks are added" means the total sum of throughputs for (n−m) tasks (m is the predetermined number) in the case where the total sum of throughputs measured most recently is for n tasks, for example. More specifically, the term means the total sum of throughputs calculated at the previous time among the total sums of throughputs measured every time the predetermined number of tasks are added.

If the first determination means 104 determines that the total sum of throughputs calculated by the total sum calculation means 103 is more than the total sum of throughputs immediately before the predetermined number of tasks are added, the task addition means 101 continues the process of adding the predetermined number of tasks. If the first determination means 104 determines that the total sum of throughputs calculated by the total sum calculation means 103 is equal to or less than the total sum of throughputs immediately before the predetermined number of tasks are added, the task addition means 101 halts the addition of the tasks.

When the addition of the tasks is halted, second determination means 105 determines whether the calculated total sum of throughputs is less than the total sum of throughputs previous to the total sum of throughputs immediately before the predetermined number of tasks are added. Note here that the term "total sum of throughputs previous to the total sum of throughputs immediately before the predetermined number of tasks are added" means throughputs for (n−m×2) tasks (m is the predetermined number) in the case where the measured throughputs are those for n tasks, for example. More specifically, the term means the total sum of throughputs calculated at the time before the previous time with respect to the total sum of throughputs measured every time the predetermined number of tasks are added.

If the second determination means 105 determines that the calculated total sum of throughputs is equal to or more than the total sum of throughputs previous to the total sum of throughputs immediately before the predetermined number of tasks are added, suspension means 106 stores information for identifying the predetermined number of last added tasks and suspends the execution of the predetermined number of last added tasks. If the second determination means 105 determines that the calculated total sum of throughputs is less than the total sum of throughputs previous to the total sum of throughputs immediately before the predetermined number of tasks are added, termination means 107 stores information for identifying the predetermined number of last added tasks and information necessary to rerun the predetermined number of last added tasks, and terminates the execution of the predetermined number of last added tasks.

Figure 2:
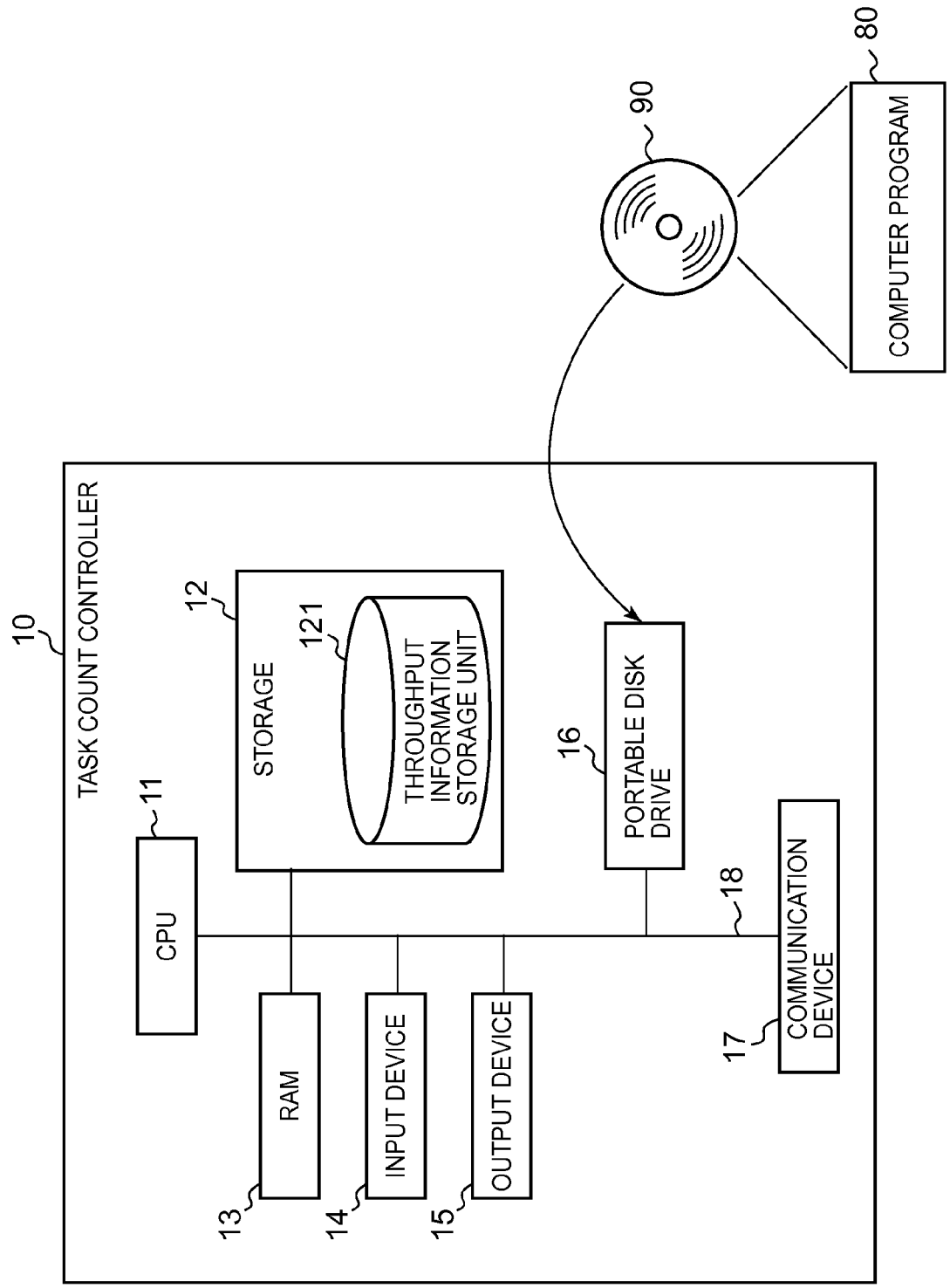
FIG. 2 is a block diagram illustrating a hardware configuration of the task count controller by using a central processing unit (CPU).

Referring to FIG. 2, there is shown a block diagram illustrating a hardware configuration of the task count controller 10 according to the embodiment of the present disclosure which uses a central processing unit (CPU) 11. In FIG. 2, the task count controller 10 according to this embodiment includes at least the CPU 11, a storage 12, a random access memory (RAM) 13, an input device 14, an output device 15, a portable disk drive 16, a communication device 17, and an internal bus 18 that connects the foregoing hardware components to each other.

The CPU 11, which is connected to the foregoing hardware components of the task count controller 10 via the internal bus 18, controls the operations of the foregoing hardware components and implements various software functions according to a computer program 80 stored in the storage 12. The RAM 13, which includes a volatile memory such as a static random access memory (SRAM) or synchronous dynamic random access memory (SDRAM), stores temporary data that is generated during execution of the computer program 80 with a load module being developed at the time of execution of the computer program 80.

The storage 12 includes an internal fixed storage (hard disk) and a read only memory (ROM). The computer program 80 stored in the storage 12 is installed by the portable disk drive 16 from a portable recording medium 90 such as a digital video disc (DVD) or a compact disc read only memory (CD-ROM) that contains programs, data, and other information and then developed from the storage 12 to the RAM 13 so as to be executed at the time of execution. Alternatively, the computer program may be downloaded from an external computer via the communication device 17.

Moreover, the storage 12 includes a throughput information storage unit 121 which stores a throughput corresponding to a task count every time tasks are added. The CPU 11 measures a throughput at the end of one unit of work for each task and stores the throughput into the throughput information storage unit 121. The CPU 11 also stores an aggregate, which is a total sum of throughputs, into the throughput information storage unit 121 for each task count. Moreover, the CPU 11 stores into the throughput information storage unit 121 identification information for identifying a suspended task in the case where the task execution is suspended and identification information including information necessary to rerun the task in the case where the task execution is terminated.

The communication device 17 is connected to the internal bus 18 and is capable of transmitting and receiving data to and from an external computer by being connected to an external network such as the Internet, local area network (LAN), or wide area network (WAN). More specifically, the foregoing storage 12 is not limited to the configuration incorporated in the task count controller 10, but may be an external storage medium such as a hard disk, which is set in an external server computer connected via the communication device 17.

The input device 14 is a data input medium such as a keyboard and a mouse, and the output device 15 is a display device such as a cathode ray tube (CRT) monitor or a liquid crystal display (LCD), or a printer such as a laser printer or a dot printer.

Figure 3:
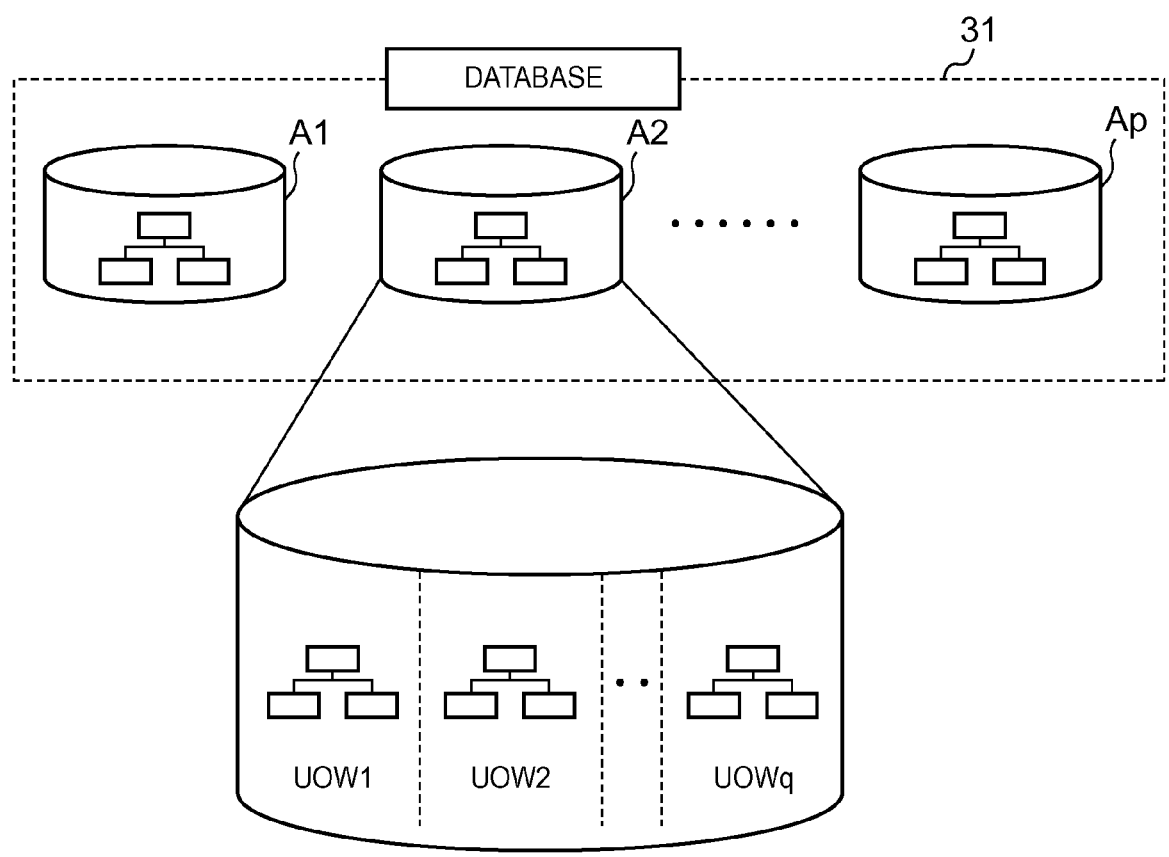
FIG. 3 is an illustrative diagram of the configuration of a hierarchical database.

Hereinafter, the embodiment will be described by taking an example of the reorganization process of a hierarchical database. Referring to FIG. 3, there is shown an illustrative diagram of the configuration of the hierarchical database according to the embodiment. As shown in FIG. 3, a hierarchical database 31 is divided into p areas (p is a natural number equal to or more than 1) and the areas are numbered with area numbers A1, A2, - - -, Ap as identification information. Each area includes q units of work UOW1, UOW2, - - -, UOWq (q is a natural number equal to or more than 1). Each unit of work includes one or more hierarchical database records and a plurality of segments form a hierarchical structure for each database record.

In this embodiment, a reorganization process task is started for each area. More specifically, the overall throughput is increased by processing a plurality of reorganization process tasks for a plurality of areas simultaneously. The organization process, however, is executed for each unit of work and therefore it is possible to measure a throughput in one unit of work when the reorganization process task for the one unit of work ends.

The throughput is obtained by dividing the number of reorganized segments by processing time. More specifically, the total sum of the number of segments included in the plurality of database records in one unit of work is divided by the processing time for each unit of work.

Figure 4:
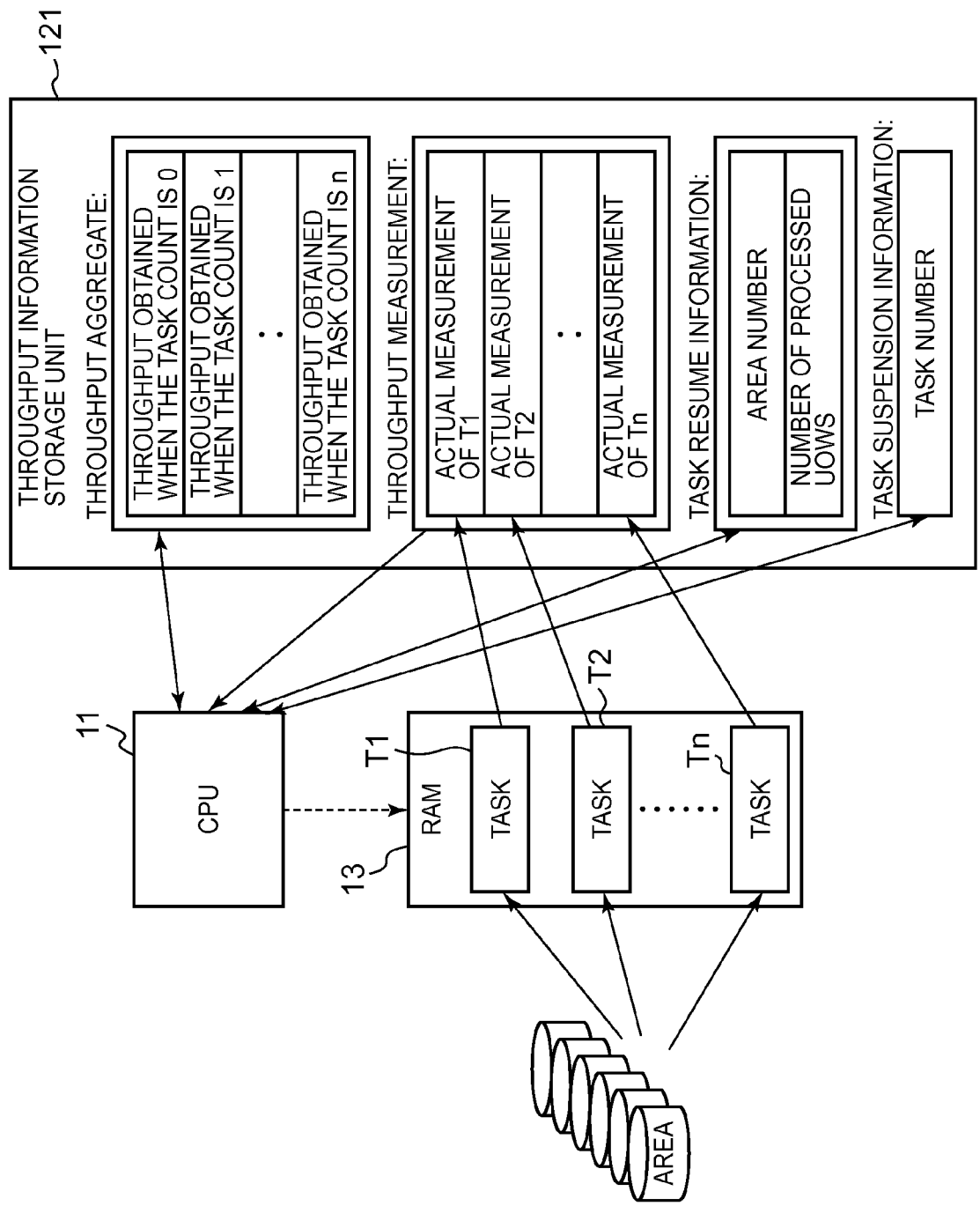
FIG. 4 is an illustrative diagram of a data structure stored in the throughput information storage unit of the task count controller.

Referring to FIG. 4, there is shown an illustrative diagram of a data structure stored in the throughput information storage unit 121 of the task count controller 10 according to the embodiment of the present disclosure. As shown in FIG. 4, the CPU 11 of the task count controller 10 executes tasks developed in the RAM 13. The tasks are numbered with task numbers T1, T2, - - -, Tn as identification information.

Actual measurements of throughputs are stored in association with task numbers in an entry "throughput measurement" in the throughput information storage unit 121. The total sum of actual measurements of throughputs of the tasks is stored for each task count in an entry "throughput aggregate" in the throughput information storage unit 121. An area number of an area where the reorganization process has been performed and the number of processed UOWs, indicating up to which point the reorganization process has proceeded, are stored as information for rerunning a forcibly terminated task in an entry "task resume information" in the throughput information storage unit 121. The task number of a suspended task is stored in an entry "task suspension information" in the throughput information storage unit 121.

Figure 5:
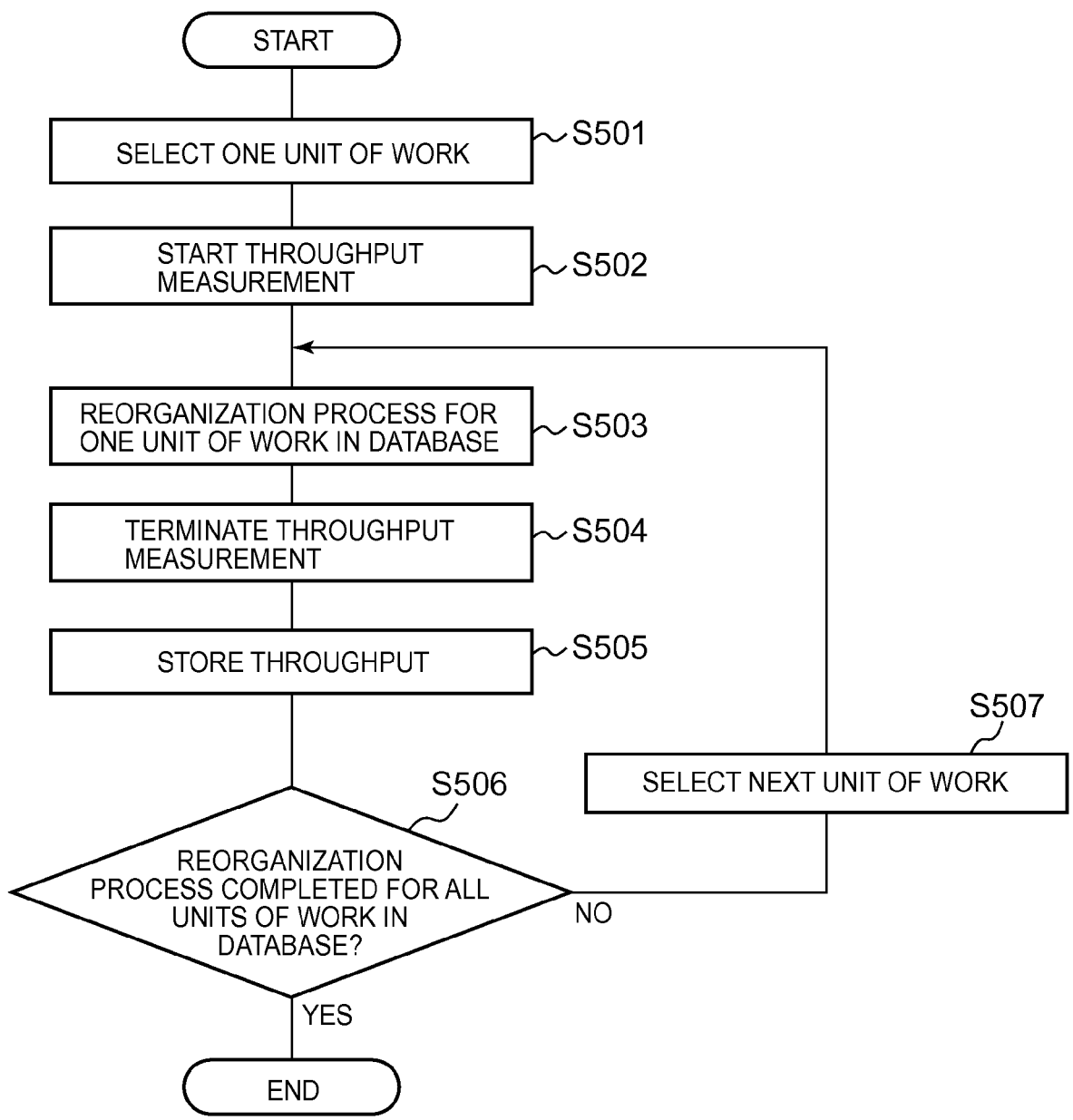
FIG. 5 is a flowchart of a processing procedure for each task of the CPU of the task count controller.

Hereinafter, a processing procedure of the task count controller 10 according to the embodiment of the present disclosure will be described in detail with reference to the drawings illustrating change of data stored in the throughput information storage unit 121. Referring to FIG. 5, there is shown a flowchart of a processing procedure for each task of the CPU 11 of the task count controller 10 according to the embodiment of the present disclosure, namely a procedure for processing in the reorganization process.

In FIG. 5, the CPU 11 of the task count controller 10 selects one unit of work such as, for example, UOW1 for which the reorganization process is performed (step S501). The CPU 11 starts throughput measurement (step S502) and performs the reorganization process for the selected unit of work (step S503).

Figure 6:
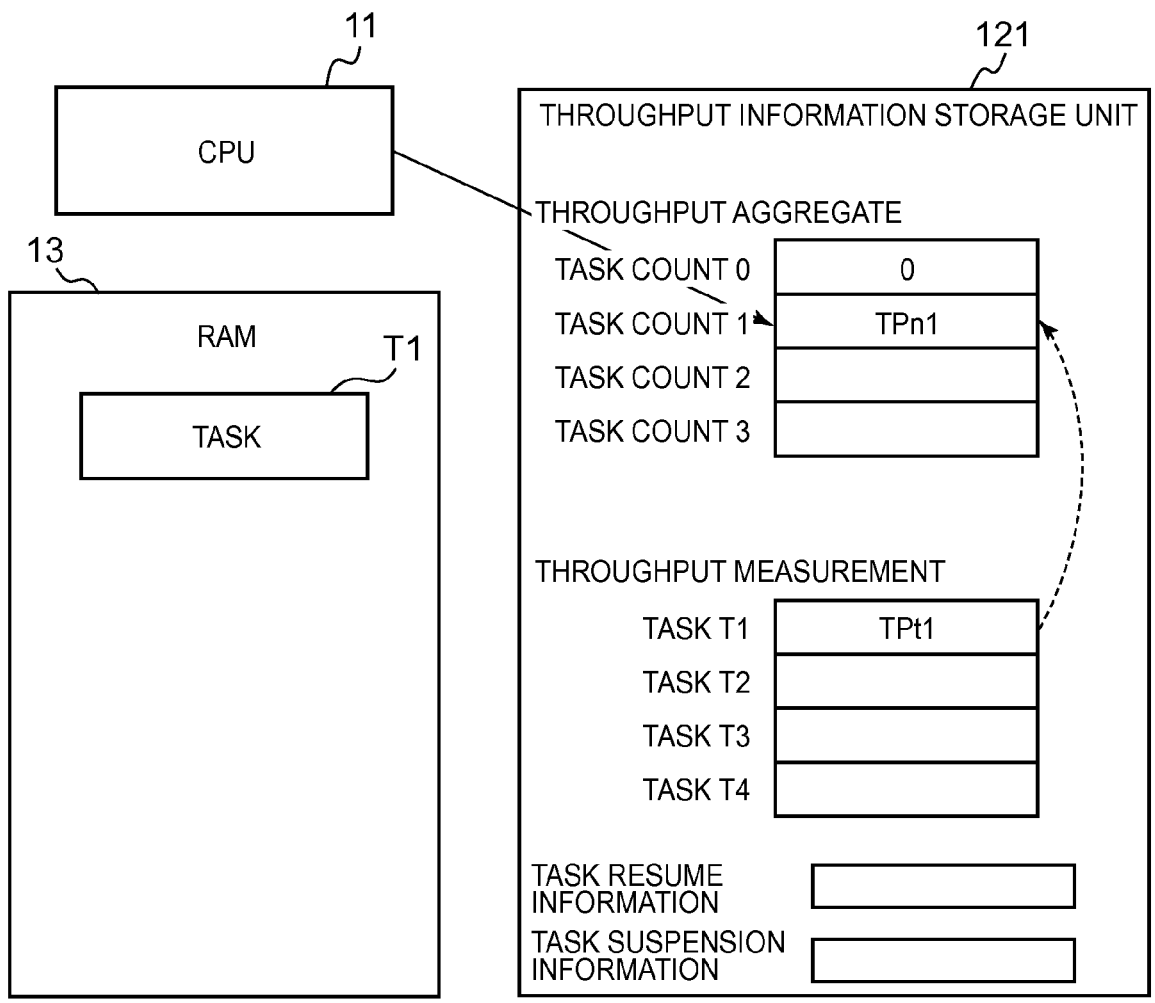
FIG. 6 is a schematic diagram illustrating the state of the throughput information storage unit at the time of completion of the reorganization process of a task.

The CPU 11 terminates the throughput measurement at the time of completion of the reorganization process of the unit of work (step S504) and stores an actual measurement of the throughput that has been measured into the throughput information storage unit 121 of the storage 12 (step S505). FIG. 6 shows a schematic diagram illustrating the state of the throughput information storage unit 121 at the time of completion of the reorganization process of the task T1. As shown in FIG. 6, a throughput actual measurement TPt1 for the task number T1 is stored in an entry "throughput measurement" in the throughput information storage unit 121. Moreover, in an entry "throughput aggregate", '0' is stored as a throughput aggregate of task count 0 and TPn1, which is the total sum of throughputs for task count 1 as a throughput aggregate for task count 1, is stored. In this case, the TPn1 value is the same as the TPt1 value.

Returning to FIG. 5, the CPU 11 of the task count controller 10 determines whether the reorganization process is completed for all units of work in the database (step S506). If the CPU 11 determines that the reorganization process is completed (step S506: YES), the CPU 11 terminates the process. If the CPU 11 determines that the reorganization process is not completed yet (step S506: NO), the CPU 11 selects the next unit of work such as, for example, UOW2 (step S507) and returns the process to step S503 to repeat the above processing.

Figure 7:
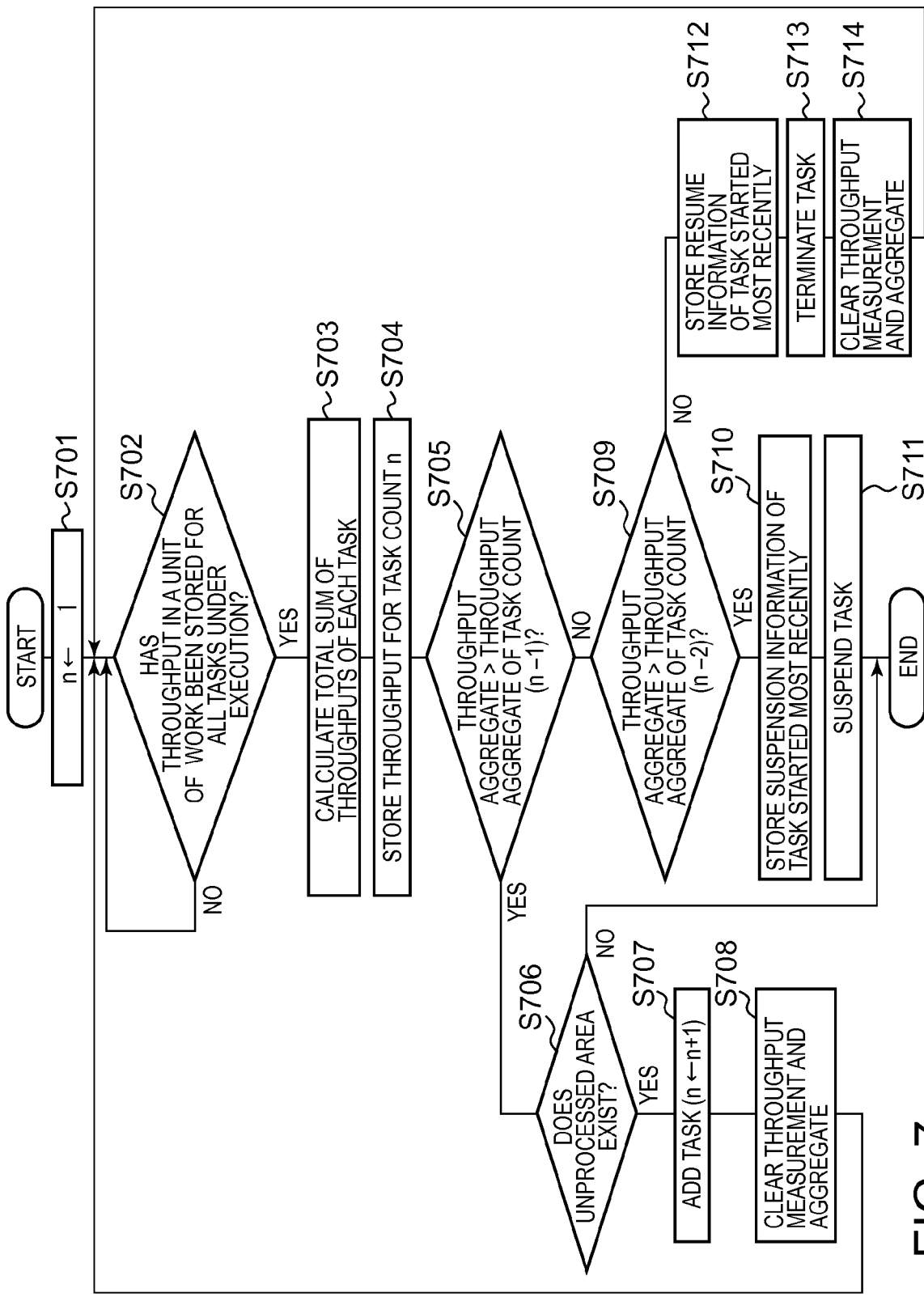
FIG. 7 is a flowchart illustrating a processing procedure for a task count control of the CPU of the task count controller.

Referring to FIG. 7, there is shown a flowchart of a processing procedure for a task count control of the CPU 11 of the task count controller 10 according to the embodiment of the present disclosure. While the processing procedure for the case where tasks are added one by one will be described with reference to FIG. 7, the disclosure is not limited thereto, but it is needless to say that tasks may be added in units of a predetermined number of tasks in some cases.

In FIG. 7, the CPU 11 of the task count controller 10 sets task count n to an initial value '1' (step S701) and determines whether the throughput actual measurement for each unit of work has been stored into the throughput information storage unit 121 for all tasks already started and under execution (step S702). If the CPU 11 determines that the throughput actual measurements have not been stored yet for all tasks (step S702: NO), the CPU 11 is placed in a wait state until the throughput actual measurements are stored for all tasks. If the CPU 11 determines that the throughput actual measurements have been stored for all tasks (step S702: YES), the CPU 11 calculates the total sum of the stored throughput actual measurements of the tasks (step S703) and stores the calculated total sum as a throughput aggregate for the task count n into the throughput information storage unit 121 of the storage 12 (step S704).

The CPU 11 determines whether the throughput aggregate stored most recently is greater than the throughput aggregate of task count (n−1) with reference to the throughput aggregates stored in the throughput information storage unit 121 of the storage 12 (step S705). More specifically, the CPU 11 determines whether there is enough computing power by utilizing the throughput characteristic that the throughput increases along with an increase in the task count if there is enough computing power, while the rate of increase in throughput decreases as the allowance in the computing power decreases and the throughput drops rapidly at the time when there is almost no allowance in computing power.

If the CPU 11 determines that the throughput aggregate stored most recently is greater than the throughput aggregate of task count (n−1) (step S705: YES), the CPU 11 determines that there is enough computing power and then determines whether one or more unprocessed areas exist (step S706). If the CPU 11 determines that no unprocessed area exists (step S706: NO), the CPU 11 terminates the processing since the tasks to be processed in parallel simultaneously do not increase.

If the CPU 11 determines that one or more unprocessed areas exist (step S706: YES), the CPU 11 adds one task for performing the reorganization process for a given area (step S707) and clears the entries "throughput measurement" and "throughput aggregate" in the throughput information storage unit 121 of the storage 12 (step S708). The CPU 11 returns the process to step S702 to repeat the above processing.

If the CPU 11 determines that the throughput aggregate stored most recently is equal to or less than the throughput aggregate of task count (n−1) (step S705: NO), the CPU 11 determines whether the throughput aggregate stored most recently is greater than the throughput aggregate of task count (n−2) (step S709). For example, if the throughput total sum stored most recently is for task count 3, that throughput total sum is compared with the throughput total sum for task count 1.

Figure 8:
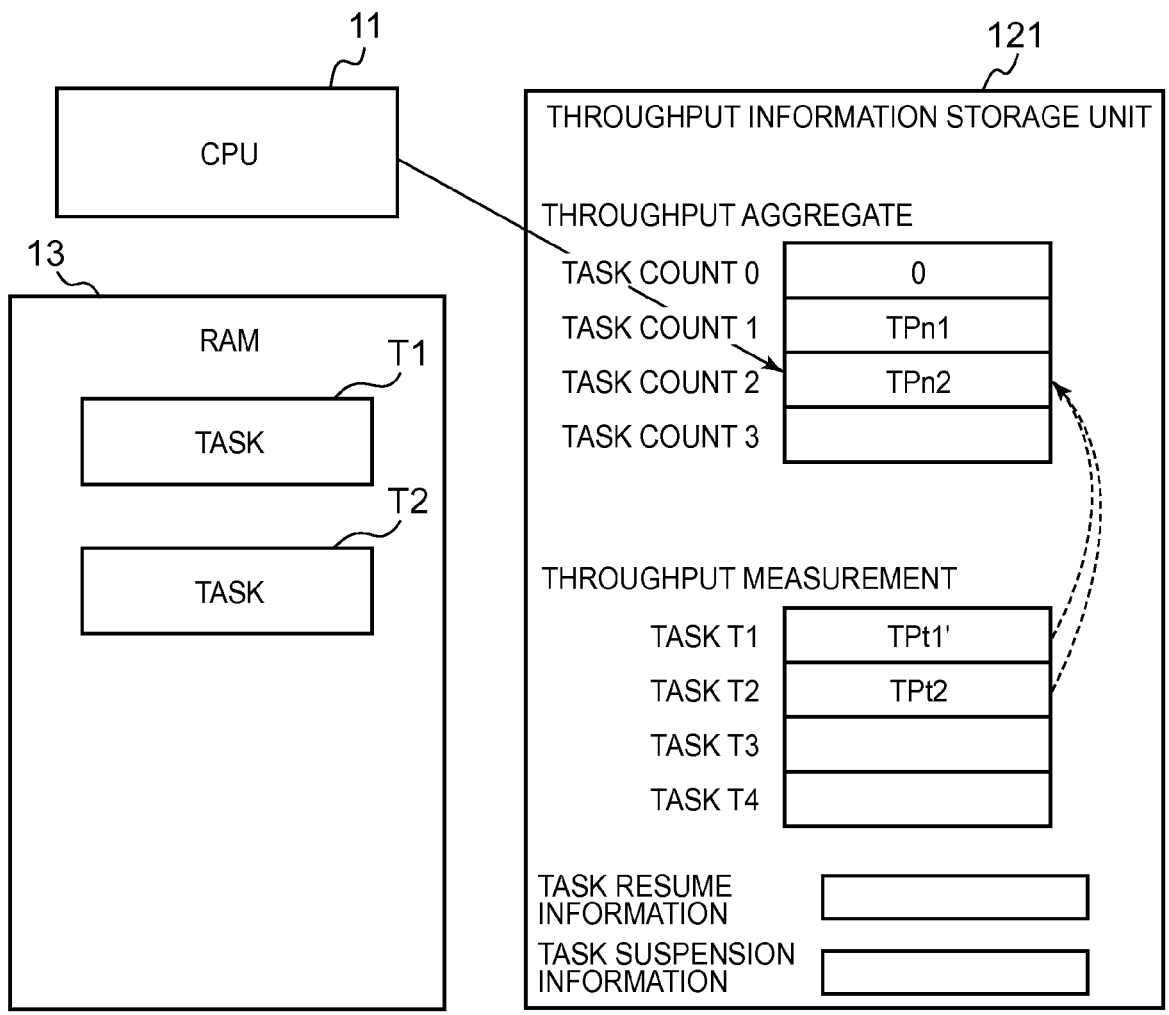
FIG. 8 is a schematic diagram illustrating a state of a throughput information storage unit at the time when the reorganization process has been completed for two tasks after one task is added.

Referring to FIG. 8, there is shown a schematic diagram illustrating a state of the throughput information storage unit 121 at the time when the reorganization process has been completed for two tasks after one task is added. As shown in FIG. 8, a throughput actual measurement TPt1' for the task number T1 and a throughput actual measurement TPt2 for the task number T2 are stored in the entry "throughput measurement" in the throughput information storage unit 121. It is needless to say that the throughput actual measurement TP1t' for the task number T1 is different in value from the throughput actual measurement TPt1 for the task number T1 for task count 1.

Then, a throughput total sum TPn2 for task count 2 is stored in the entry "throughput aggregate." In this instance, TPn2 equals the sum of TPt1' and TPt2.

Figure 9:
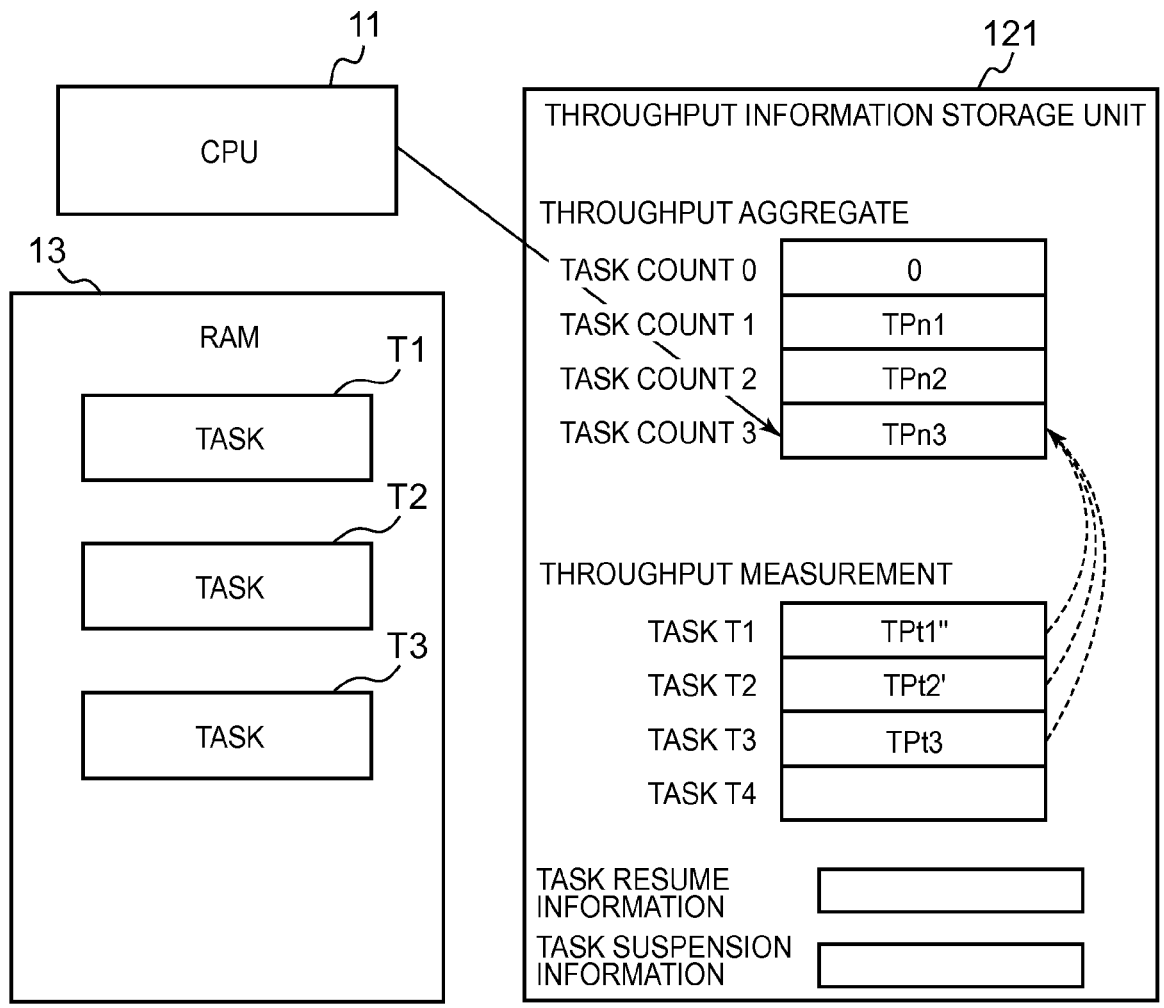
FIG. 9 is a schematic diagram illustrating a state of the throughput information storage unit at the time when the reorganization process has been completed for three tasks after one more task is added.

Similarly, FIG. 9 is a schematic diagram illustrating a state of the throughput information storage unit 121 at the time when the reorganization process has been completed for three tasks after one more task is added. As shown in FIG. 9, a throughput actual measurement TPt1" for the task number T1, a throughput actual measurement TPt2' for the task number T2, and a throughput actual measurement TPt3 for the task number T3 are stored in the entry "throughput measurement" in the throughput information storage unit 121. It is needless to say that the throughput actual measurement TP1t" for the task number T1 is different in value from the throughput actual measurement TPt1 for the task number T1 for task count 1 and from the throughput actual measurement TPt1' for the task number T1 for task count 2 and that the throughput actual measurement TPt2' for the task number T2 is different in value from the throughput actual measurement TPt2 for the task number T2 for task count 2.

The throughput total sum TPn3 for task count 3 is then stored in the entry "throughput aggregate." In this instance, TPn3 equals the sum of TPt1", TPt2', and TPt3.

Therefore, the throughput aggregates TPn3 and TPn2 are compared with each other in step S705 of FIG. 7 and the throughput aggregates TPn3 and TPn1 are compared with each other in step S709. It is because the following relationship is satisfied in the case where there is enough computing power: TPn3>TPn2>TPn1.

Returning to FIG. 7, if the CPU 11 of the task count controller 10 determines that the throughput aggregate stored most recently is greater than the throughput aggregate of task count (n−2) (step S709: YES), the CPU 11 stores information on suspension of the task started most recently into the throughput information storage unit 121 of the storage 12 (step S710) and causes the task started most recently to be suspended (step S711).

Figure 10:
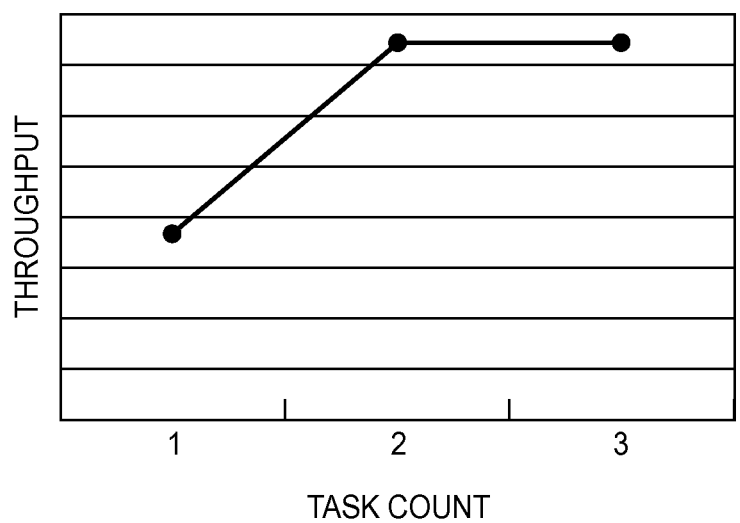
FIG. 10 is an illustrative diagram of change of throughputs for the case where a throughput aggregate stored most recently is greater than the throughput aggregate of task count (n−2).

Referring to FIG. 10, there is shown an illustrative diagram of change of throughputs for the case where the throughput aggregate stored most recently is greater than the throughput aggregate of task count (n−2). While the throughput aggregate TPn3 is greater than TPn1, TPn3 does not increase from the level of TPn2. Therefore, it is possible to determine that the task count cannot be incremented any more though the computing power has not reached the limit yet.

Figure 11:
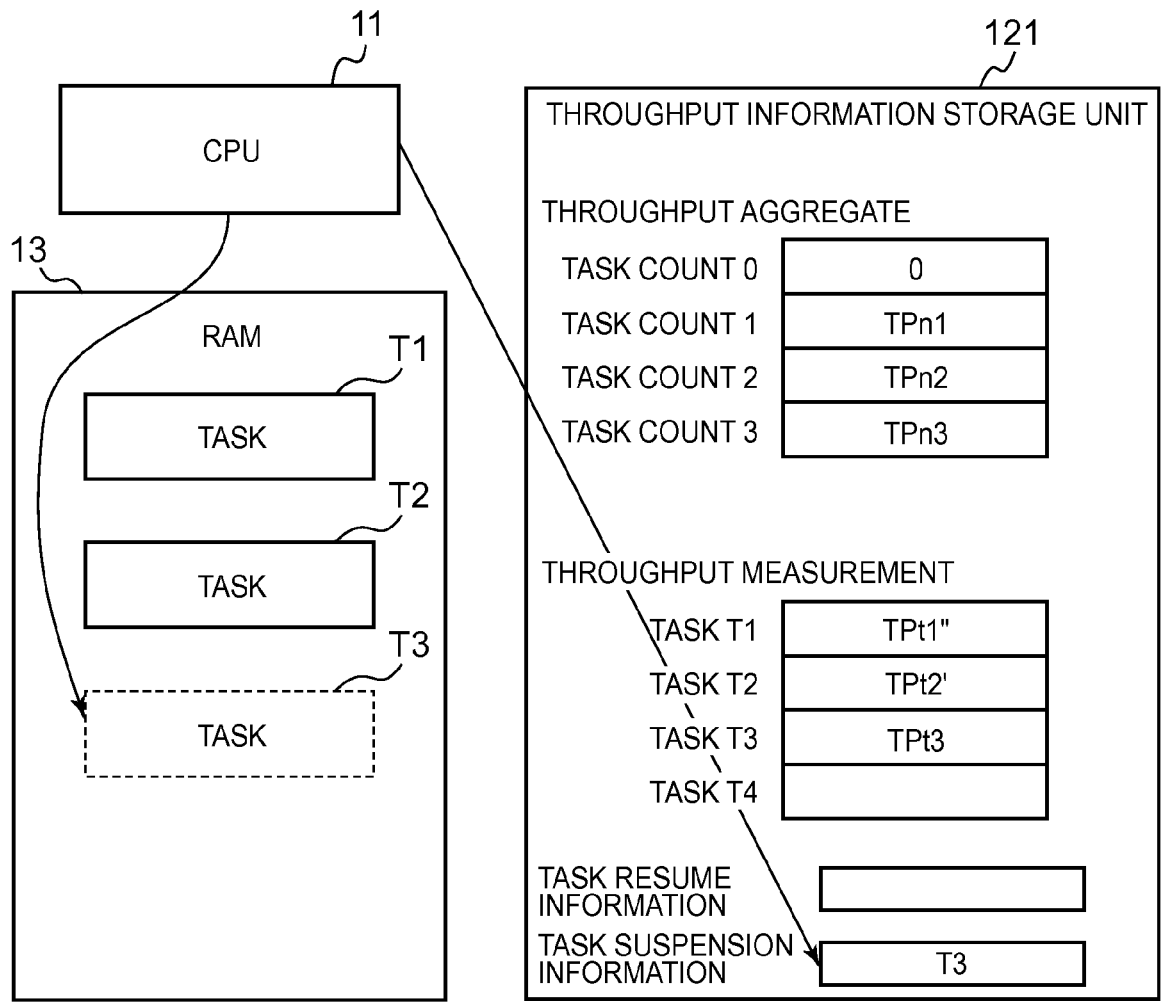
FIG. 11 is a schematic diagram illustrating a state of the throughput information storage unit for the case of suspending a task started most recently.

Referring to FIG. 11, there is shown a schematic diagram illustrating a state of the throughput information storage unit 121 for the case of suspending the task T3 started most recently. As shown in FIG. 11, the task number T3 for identifying the task to be suspended is stored in the entry "task suspension information" in the throughput information storage unit 121. Storing the task number enables rerunning to be performed immediately after one task terminates.

Returning to FIG. 7, if the CPU 11 of the task count controller 10 determines that the throughput aggregate stored most recently is equal to or less than the throughput aggregate of task count (n−2) (step S709: NO), the CPU 11 stores resume information for resuming the task started most recently into the throughput information storage unit 121 of the storage 12 (step S712) and terminates the task started most recently (step S713). This gives a task count of (n−1) for the tasks processed in parallel simultaneously.

The CPU 11 clears the entries "throughput measurement" and "throughput aggregate" in the throughput information storage unit 121 of the storage 12 (step S714) and returns the process to step S702 to repeat the above processing. Note that the process in step S506 and subsequent steps in FIG. 5 and the above task count control process are processed in parallel practically. Therefore, it is possible to control the number of tasks to be optimal substantially in real time on the basis of the throughput that varies with the progress of the reorganization process.

Figure 12:
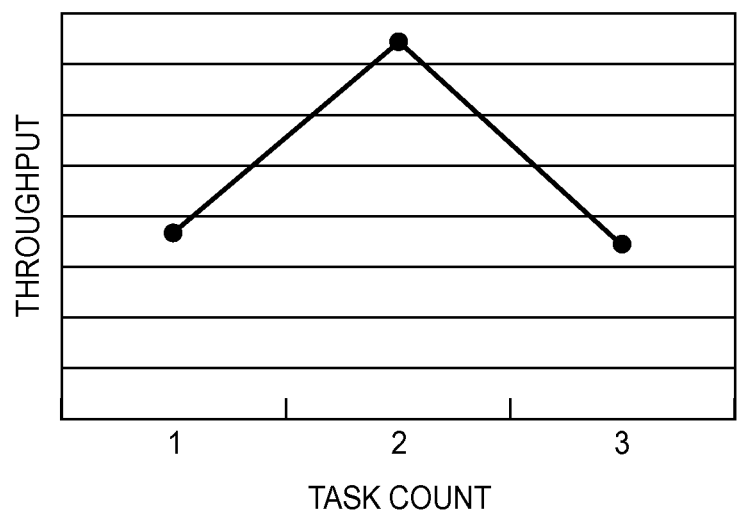
FIG. 12 is an illustrative diagram of change of throughputs for the case where a throughput aggregate stored most recently is equal to or less than the throughput aggregate of task count (n−2).

Referring to FIG. 12, there is shown an illustrative diagram of change of throughputs for the case where the throughput aggregate stored most recently is equal to or less than the throughput aggregate of task count (n−2). Since the throughput aggregate TPn3 is less than TPn1, it is possible to determine that the computing power reaches a limit and that the task count cannot be incremented unless one of the tasks is forcibly terminated.

Figure 13:
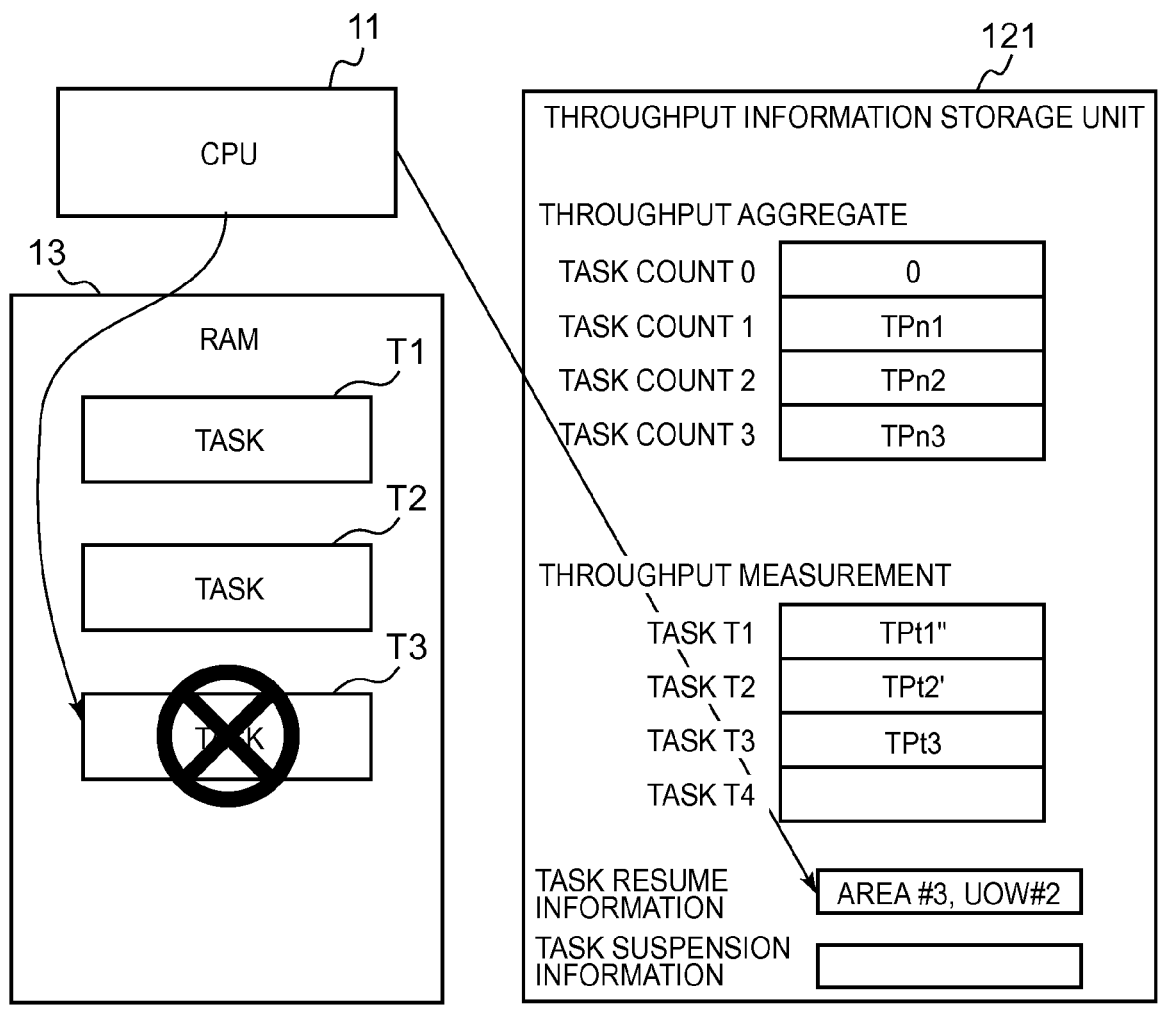
FIG. 13 is a schematic diagram illustrating a state of the throughput information storage unit for the case where the task started most recently is forcibly terminated.

Referring to FIG. 13, there is shown a schematic diagram illustrating a state of the throughput information storage unit 121 for the case where the task T3 started most recently is forcibly terminated. As shown in FIG. 13, the throughput information storage unit 121 stores an area number of an area where the terminated task has performed the reorganization process and the number of processed UOWs, indicating up to which point the reorganization process has proceeded, as task resume information.

Figure 14:
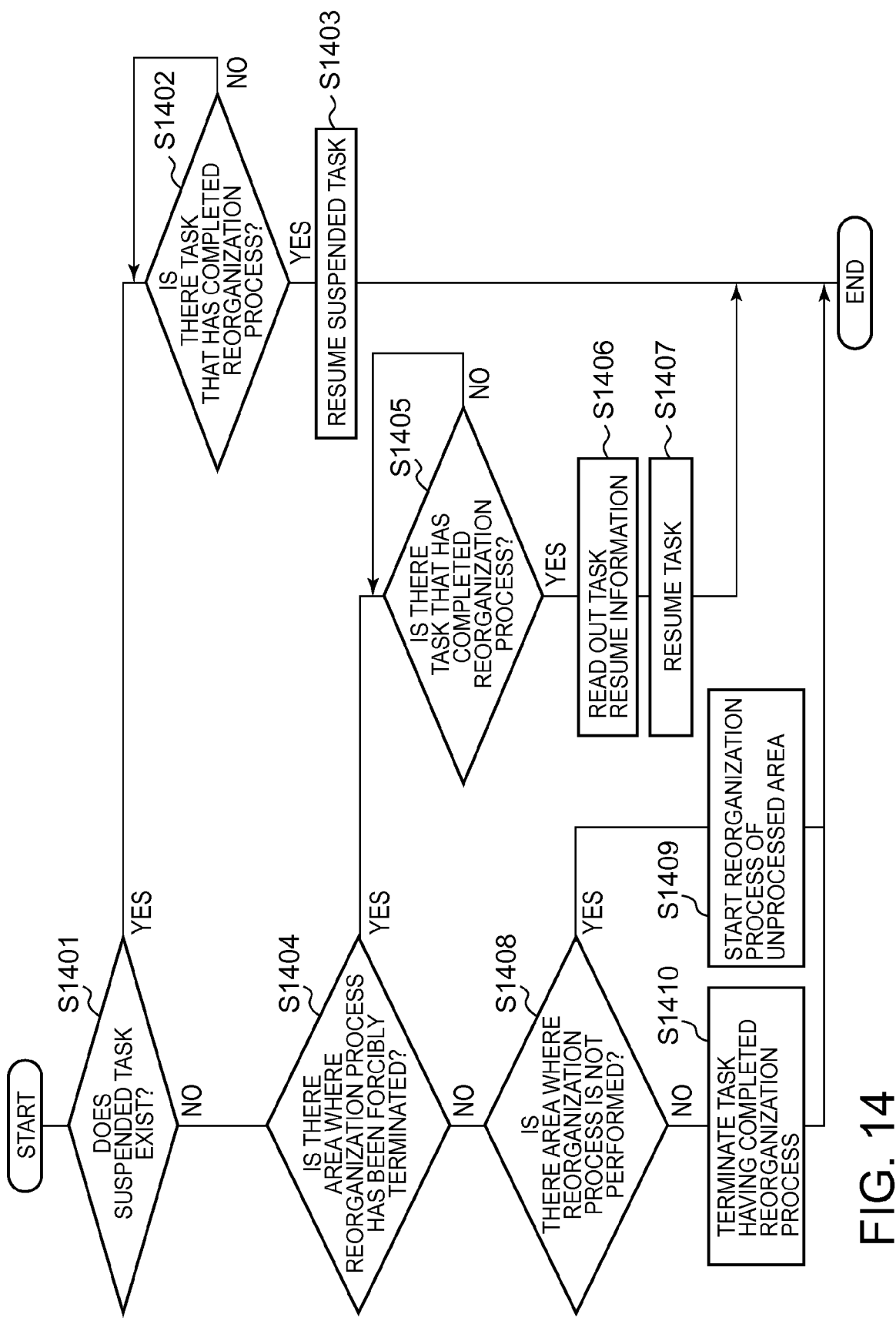
FIG. 14 is a flowchart of a postprocessing procedure of the CPU in the task count controller.

When the reorganization process of one area is completed, the CPU 11 checks the existence of a suspended task and the existence of a forcibly terminated task with reference to the throughput information storage unit 121 of the storage 12 and then performs postprocessing. Referring to FIG. 14, there is shown a flowchart of a postprocessing procedure of the CPU 11 of the task count controller 10 according to the embodiment of the present disclosure.

In FIG. 14, the CPU 11 of the task count controller 10 according to the embodiment of the present disclosure determines whether a suspended task exists with reference to the entry "task suspension information" in the throughput information storage unit 121 (step S1401). More specifically, the CPU 11 determines the existence of the suspended task according to whether the task number is stored in the entry "task suspension information." If the CPU 11 determines that a suspended task exists (step S1401: YES), the CPU 11 determines whether there is a task that has completed the reorganization process (step S1402).

If the CPU 11 determines that there is no task that has completed the reorganization process (step S1402: NO), the CPU 11 becomes a wait state for the completion. If the CPU 11 determines that there is a task that has completed the reorganization process (step S1402: YES), the CPU 11 determines that there is enough allowance in the computing power and resumes the task of the task number stored in the entry "task suspension information" (step S1403).

If the CPU 11 determines that no suspended task exists (step S1401: NO), the CPU 11 determines whether there is an area where the reorganization process has been forcibly terminated (step S1404). More specifically, the CPU 11 determines the existence of the area according to whether necessary information is stored in the entry "task resume information." If the CPU 11 determines that there is an area where the reorganization process has been forcibly terminated (step S1404: YES), the CPU 11 determines whether there is a task that has completed the reorganization process (step S1405).

If the CPU 11 determines that there is no task that has completed the reorganization process (step S1405: NO), the CPU 11 becomes a wait state for the completion. If the CPU 11 determines that there is a task that has completed the reorganization process (step S1405: YES), the CPU 11 determines that there is enough allowance in the computing power and reads out the "task resume information" (step S1406) to resume the task (step S1407).

If the CPU 11 determines that there is no area where the reorganization process has been forcibly terminated (step S1404: NO), the CPU 11 determines whether there is an area where the reorganization process is not performed yet (step S1408). If the CPU 11 determines that there is an area where the reorganization process is not performed yet (step S1408: YES), the CPU 11 starts the reorganization process for the unprocessed area (step S1409). If the CPU 11 determines that there is no area where the reorganization process is not performed yet (step S1408: NO), the CPU 11 terminates a task that has completed the reorganization process (step S1410).

As described above, according to the embodiment, it is possible to determine whether there is enough computing power and to control whether to add tasks to be processed in parallel simultaneously, by comparing the total sum of throughput measurements before and after adding a predetermined number of tasks to determine whether the throughput decreases after adding the predetermined number of tasks by utilizing the characteristic that the rate of increase in throughput decreases as the allowance in the computing power decreases and the throughput drops rapidly at the time when there is almost no allowance in the computing power, which thereby allows the determination of the upper limit of the task count that does not reduce the computing power.

While tasks are added in units of a predetermined number of tasks and the total sum of throughput measurements is compared between before and after adding the predetermined number of tasks in the embodiment, it is also possible to vary the number of tasks to be added, instead of adding the predetermined number of tasks regularly. For example, while the throughput constantly increases until the task count reaches a certain number, the rate of increase decreases gradually. Therefore, it is possible to rapidly obtain the upper limit of the number of tasks that can be processed in parallel simultaneously by decreasing the number of tasks to be added at the time when the rate of increase becomes equal to or less than a predetermined value and setting the number of tasks to be added to 1 in the vicinity of the limit of the computing power.

Moreover, it is to be understood that the present disclosure is not limited to the above embodiment and various modifications, replacement or the like can be made without departing from the spirit and scope of the disclosure. For example, the disclosure is not limited to the reorganization process of a database, and it is possible to expect the same effect as that of the above embodiment in any application which can increase the overall throughput by performing parallel processing.

We claim:

1. A computer program product comprising a computer useable non-transitory medium having a computer readable program, wherein the computer readable program when executed on a computer causes the computer to:
add to a memory a predetermined number of tasks to be executed simultaneously, each task having a plurality of units of work;
measure, for each of the predetermined number of tasks, a throughput, the throughput being a processing time for one unit of work of that task;
calculate a current total sum of throughputs that equals the sum of the measured throughputs for the predetermined number of tasks; and
halt addition of any other tasks if the current total sum of throughputs is less than or equal to a prior calculated total sum of throughputs for tasks executed prior to addition of the predetermined number of tasks.

2. The computer program product of claim 1, wherein the one unit of work is one of a plurality of units of work included in a task.

3. The computer program product of claim 1, wherein the throughput is an index indicating a process efficiency using the number of processed data per unit time.

4. The computer program product of claim 1, wherein the computer is further caused to store information for identifying the predetermined number of tasks added last and information necessary to rerun the tasks and terminate the execution of the predetermined number of tasks added last if the measured total sum of throughputs is less than or equal to the total sum of throughputs immediately before the predetermined number of tasks are added.

5. The computer program product of claim 1, wherein the predetermined number of tasks equals one.

6. The computer program product of claim 1, wherein the predetermined number of tasks is greater than one.

7. A method comprising:
adding to a memory a predetermined number of tasks to be executed simultaneously, each task having a plurality of units of work;
measuring, for each of the predetermined number of tasks, a throughput, the throughput being a processing time for one unit of work of that task;
calculating a current total sum of throughputs that equals the sum of the measured throughputs for the predetermined number of tasks; and
halting addition of any other tasks if the current total sum of throughputs is less than or equal to a prior calculated total sum of throughputs for tasks executed prior to addition of the predetermined number of tasks.

8. The method of claim 7, wherein the one unit of work is one of a plurality of units of work included in a task.

9. The method of claim 7, wherein the throughput is an index indicating a process efficiency using the number of processed data per unit time.

10. The method of claim 7, further comprising storing information in a throughput information storage unit of the task controller, the information identifying the predetermined number of tasks added last and information necessary to rerun the tasks and terminate the execution of the predetermined number of tasks added last if the measured total sum of throughputs is less than or equal to the total sum of throughputs immediately before the predetermined number of tasks are added.

11. The method of claim 7, wherein the predetermined number of tasks equals one.

12. The method of claim 7, wherein the predetermined number of tasks is greater than one.

13. An apparatus comprising:
a processor that adds to a memory a predetermined number of tasks to be executed simultaneously, measures, for each of the predetermined number of tasks, a throughput, calculates a current total sum of throughputs that equals the sum of the measured throughputs for the predetermined number of tasks, and halts addition of any other tasks if the current total sum of throughputs is less than or equal to a prior calculated total sum of throughputs for tasks executed prior to addition of the predetermined number of tasks, each task having a plurality of units of work measures, the throughput being a processing time for one unit of work of that task.

14. The apparatus of claim 13, wherein the one unit of work is one of a plurality of units of work included in a task.

15. The apparatus of claim 13, wherein the throughput is an index indicating a process efficiency using the number of processed data per unit time.

16. The apparatus of claim 13, further comprising a throughput information storage unit that stores information identifying the predetermined number of tasks added last and information necessary to rerun the tasks and terminate the execution of the predetermined number of tasks added last if the measured total sum of throughputs is less than or equal to the total sum of throughputs immediately before the predetermined number of tasks are added.

17. The apparatus of claim 16, wherein the processor provides the information to the throughput information storage unit.

18. The apparatus of claim 13, further comprising a throughput information storage unit that stores the throughput.

19. The apparatus of claim 13, wherein the predetermined number of tasks equals one.

20. The apparatus of claim 13, wherein the predetermined number of tasks is greater than one.

* * * * *